(12) United States Patent
Hiesinger

(10) Patent No.: US 7,054,549 B2
(45) Date of Patent: May 30, 2006

(54) VARIABLE BACKGROUND FOR PHOTOGRAPHIC PICTURES

(75) Inventor: Reingard Hiesinger, Ottobeuren (DE)

(73) Assignee: Novoflex GbR Bothe, Hiesinger und Mann, Memmingen (DE)

( * ) Notice: Subject to any disclaimer, the term of this patent is extended or adjusted under 35 U.S.C. 154(b) by 0 days.

(21) Appl. No.: 10/722,398

(22) Filed: Nov. 28, 2003

(65) Prior Publication Data

US 2005/0117896 A1  Jun. 2, 2005

(51) Int. Cl.
G03B 15/00 (2006.01)
G03B 15/02 (2006.01)

(52) U.S. Cl. ............................................. 396/3; 362/18
(58) Field of Classification Search .................... 396/3, 396/4; 362/18, 3, 16
See application file for complete search history.

(56) References Cited

U.S. PATENT DOCUMENTS

| 3,643,085 A | | 2/1972 | Durand | 240/20 |
| 3,789,448 A | * | 2/1974 | Mitchell | 441/59 |
| 5,235,368 A | * | 8/1993 | Oglesbee | 396/4 |
| 5,513,670 A | * | 5/1996 | Childress et al. | 135/154 |
| 5,619,299 A | * | 4/1997 | Fleming-Schaub | 396/3 |
| 5,993,334 A | * | 11/1999 | McNamara | 473/446 |
| 6,237,820 B1 | * | 5/2001 | Saxton | 224/148.5 |

FOREIGN PATENT DOCUMENTS

| DE | 35 28 668 A1 | 2/1987 |
| DE | 92 15 330 U1 | 2/1993 |
| DE | 200 20 126 U1 | 3/2001 |

OTHER PUBLICATIONS

Cloud Dome Products and Accessories, Dec. 3, 2003, http://www.clouddome.com.*
Novoflex Magic Studio, http://www.novoflex.de/english/html/co_ems.php.*
Shutterbug, Tripods and Various Weird Stuff, Dec. 2002, http://www.shutterbug.net/show_reports/1202sb_tripods, p. 2.*

* cited by examiner

Primary Examiner—Christopher Mahoney
(74) Attorney, Agent, or Firm—Jacobson Holman PLLC

(57) ABSTRACT

The invention refers to a variable background for photographic pictures which comprises a flexible basic body, which supports the object which has to be photographed, and at least one adjustment device for modifying the shape of the basic body.

23 Claims, 6 Drawing Sheets

VARIABLE BACKGROUND FOR PHOTOGRAPHIC PICTURES

BACKGROUND OF THE INVENTION

Figure 1A:
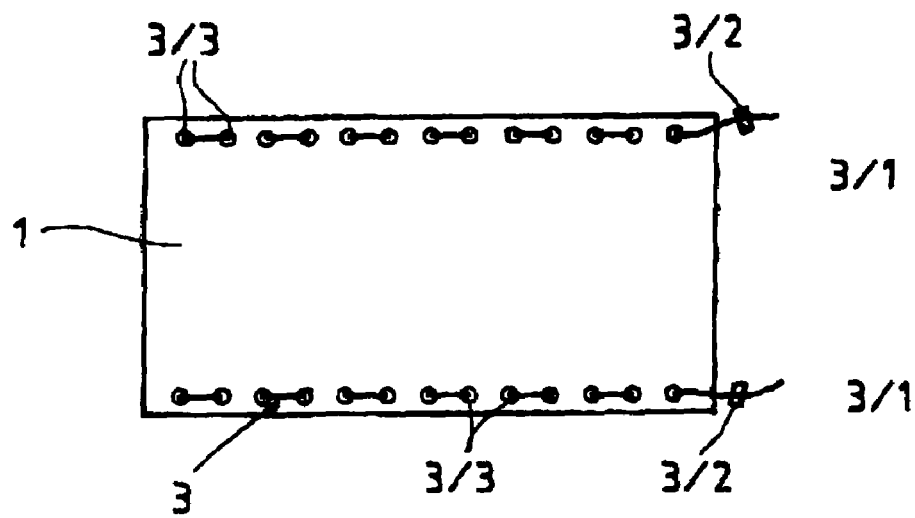

The invention refers to a variable background for photographic pictures.

Photograph desks for forming a background for special photographic pictures are known. These are photograph desks which have a stable stand, respectively a frame, between which a foil, respectively a slab, is arranged fixedly. It is also known to design these photographic desks in such a way that they can be dismantled.

All solutions which are known so far for this problem are photographic desks which cannot be changed in their angle positions. This goes also for photographic desks which are designed to be dismantled for transport and storing.

If a background as homogenous as possible has to be created, for example to photograph a comparatively large object, then this is either not achieved at all or only with considerable (time) effort with the known photographic desk.

From the German specification DE 37 28 668 A 1 a variable background for close shots is known which can also be allocated to the solutions of the state of the art described before. The solution described here comprises a basic slab on which a frame is screwed. Basic slab and frame here are arranged rectangular to each other. A girder with clamping devices for attaching a background cardboard is arranged movably on the frame. A similar clamping device is provided on the front edge of the basic frame in order to clamp on this background cardboard as well. By means of adjusting the girder on the frame the radius of the background cardboard can also be altered. In the frame three rollers are provided furthermore on which tarpaulins made of textile materials or similar materials in different colours can be arranged. If required one of the tarpaulins can be uncoiled and also be fastened to the clamping device of the basic slab. However, this produces a comparatively unstable form of the fabric which may have negative influence on the photographs, for example because of wind movements or the like. If more stable material is used the mouldability is limited to very few embodiments. The device also is altogether very complicated and has to be dismantled for transportation which makes the whole matter very time consuming and inflexible. This variable background may be suited for studio shots. For the flexible use, for example at the customer's, this apparatus is too unwieldy. Furthermore the forms of the flexible background which can be set by the device are very limited so that the pictures which are possible by means of that do not guarantee an optimum background design with very different forms, either.

The dismantling, respective the mounting, of the solutions for the photographic desks known from the state of the art is altogether very time consuming. This is in particular a disadvantage as shots like that nowadays have to be produced within a very short time, for example after the telephone call of the customer, at the customer's. For that purpose it is necessary to take the complete photo equipment inclusively the dismantled photograph desks to the customer's and to produce there the corresponding photographs of products, construction parts and so on. The mounting, respectively the dismantling of the photograph desks takes here a lot of time so that this slows down the whole procedure. The demand for very fast results does not allow anymore such a loss of time. The present systems are so inflexible that for very different shots, for example, even different photograph desks are needed in order to be able to realise different forms of design.

BRIEF SUMMARY OF THE INVENTION

Coming from the state of the art described above it is an object of the invention to create a solution that provides a background for photographic pictures as flexible as possible, which can be also transported easily.

According to the invention this object of the invention is solved by a variable background for photographic pictures which comprises a flexible basic body which supports the object which has to be photographed, wherein the flexible basic body has at least one adjustment device for modifying the shape of the basic body. The flexible basic body can be formed here by a translucent, colourless and/or coloured plastic foil or metal foil. Of course the basic body can also be formed from a white or coloured cardboard which is sufficiently stiff. By means of this combination of this flexible basic body with an adjustment device for modifying the shape of the basic body, it is easily possible, by means of such a simple foil combined with an adjustment device, to put this foil and adjustment device in addition to the camera equipment's, which are necessary, into the trunk of a car and to go to the customer in order to produce the required shots. In addition to the saved time for establishing the background for photographic pictures there is also the advantage that by means of the foil and the adjustment device the possibility is presented to design very different angles up to the S-form for a variable background by means of this simple foil. By means of that very high requirements concerning the background can be met with very simple and economic solutions. By means of the high variability also large objects can be photographed in a simple way. The invention realises in a way which is simple to mount the establishing of a "small" photo studio which is even suited for professional work at the customer's in a short period of time.

An opportunity for the realisation of the adjustment device is given, for example, by the fact that on the sides of the flexible basic body openings are arranged which can be designed as circular or elongated holes through which, for example, a cord string may be drawn. This cord string here is guided alternately through the openings. By means of the cord string the foil may be drawn into different shapes by tensioning. These cord strings have fastening means which make a tensioning in very angle positions possible. If, for example, two cord strings with different fastening means on both sides are used, also a tensioning in S-shape is possible. The fastening means here may be indicated by clamps, knots in the cord string, by buttons with clamping devices, pins which are arranged movably on the cord string or the like.

Therefore by means of the solution according to the invention of a variable background a background is created which can be mounted quickly and which is flexibly suitable for all possible and different shooting techniques.

According to an advantageous development of the variable background according to the invention the flexible basic body is formed by a translucent, colourless and/or coloured foil.

The variable background is also characterised by the fact that the flexible basic body has such a stiffness that it can take different shapes, however, keeps an even surface, if the shape is changed. For that purpose, for example, plastic foils are suited, which may be flexible, however, sufficiently stiff in order to carry out bendings and angles without any problems. However, the surface of the foil remains even, in order to avoid shade edges. After the releasing of the adjustment device, respectively the fixing, the foil returns into its own original shape on its own.

According to an advantageous development of the invention therefore the flexible basic body is formed by a plastic foil, paper, respectively cardboard, or even by a flexible metal foil.

Another aspect is given by the fact that the adjustment device is indicated by openings obtained at least on one side of the flexible basic body by means of punchings, through which a string, a rope, a fiber or the like is guided alternately, respectively S-like, wherein at least one end of the string can be fixed by means of a fixing means. It is sufficient if at least one fixing means for fixing the tension of the string is provided, when here at least one side of the string is linked fixedly with the variable background, respectively the sliding of the string through the openings is prevented by means of a knot. The fixing means may also be indicated for example by means of fixing screws which are shaped cylinder-like with a boring for the string. Here a screw can be screwed into the cylinder in such a way that it clamps the string guided through the boring by means of clamping it with the screw. Of course, in the same way fixing means which operate with spring force can be used. Furthermore, naturally, it is possible to use screws, pins or the like, which lead to a fixing only by winding or knotting them with the string.

According to a convenient development the variable background is characterised by the fact that at least on one of the cross sides of the flexible basic body reinforcements are provided.

These reinforcements reach that the flexible basic body does not sag when photo objects are put on when these have a certain weight.

It has also been found to be an advantage when the reinforcements are indicated by metal bows, plastic reinforcements or the like. It is, for example, sufficient, if the reinforcements are shaped by an angle of the foil at the ends of the flexible basic body. With even heavier photo objects it may be necessary then to indicate these reinforcements by means of metal bows or plastic bows or strips. These strips or metal bows are designed here in such a way that they are fastened either to the flexible basic body or the shots are taken even without these reinforcements if a reinforcing is not necessary.

According to a development of the solution according to the invention it is provided that the flexible basic body can be brought into the angled position by means of the adjustment device, wherein the angle can be chosen freely and, according to the respective photographic picture, respectively the photographic technique, can be modified freely. This can simply be solved by means of the simplest form of the adjustment device, namely by a cord string guided through the openings, if both ends of the cord string are provided with fixing means by means of which the tension can be modified, or even, if only one fixing means is provided, and the other end of the cord string is, for example, arranged fixedly at the flexible basic body.

In a development of the variable background at least two or more angulations of the flexible basic body are provided. This is achieved, for example, through two adjustment devices, respectively two cord strings, with fixing means on the basic body on at least one side of this basic body. More constant angle shapes can be reached by arranging the cord strings on both sides of the flexible basic body and by tensioning them equally.

The arrangement of the openings here can be carried out with regular distances only in pairs or also irregularly. This depends in the individual case from the shapes of the variable basic body which has to be designed.

According to a development of the variable background it is provided that the basic body has such a stiffness that it forms a tunnel when opposing sides of it are linked and tensioned by means of the adjustment device. By means of that also in a very simple way shots with the desired tunnel effect can be realised.

A development of the variable background provides that by rolling of the basic body itself and then tensioning of the variable basic body by means of the adjustment device, respectively of another fixing means, it takes the shape of a tent. This other fixing means may be realised, for example, through a Velcro fastener, which is arranged in the shape of a dot on both sides of the variable basic body. It is also possible to provide just openings on certain points through which then a fixing means, for example a screw, rivet or the like is guided in order to fix it. Of course, also a snap fastener is suitable for that purpose.

According to a convenient development of the variable background it is provided that by means of rolling of the basic body itself and following tensioning by means of the adjustment device it forms the shape of a tube.

A development of the variable background provides that the basic body, as described before, then is brought into the shape of a cone, respectively a truncated cone. When this form has been reached the basic body is fixed again at the provided points.

The invention is characterised by the fact that on the longitudinal sides of the basic body fastening devices are provided by means of which the basic body can be fastened to a support or the like. By means of such a solution it is then possible that the variable background can be fastened to a desk, frame or the like so that an unintended shifting, respectively moving, is more difficult then. As fastening devices in the variant described before screws, rivets, paper clips, clamps or the like are suitable.

According to an advantageous development of the invention the fastening device is indicated by means of a Velcro fastener, snap fasteners, zip fastener or the like.

One development of the variable background is characterised by the fact that the basic body is designed in such a way that it can be put on a frame, in particularly fixedly. By means of such a solution then a photograph desk can be realised which is characterised against the state of the art by the fact that the basic body is designed flexibly and through that any form for special photographic pictures, as described above, can be realised. The frame can be here already designed as a desk, however, it is sufficient if in the simplest form first of all a simple frame is provided on which then the basic body can be put fixedly.

Another aspect of the variable background according to the invention is given by the fact that the frame is designed as a frame consisting of at least three parts wherein the single parts can be connected to each other. In this way then the form of a desk, chair or the like can be combined through the single frame parts.

A development of the variable background according to the invention is characterised by the fact that the frame parts can be connected to each other by means of inserted connectors. It is a particular advantage here if inserted connectors are available in different angles.

A development of the variable background provides that the frame parts can be connected to each other by means of joints which can be fixed. Also, by means of these joints, any desired angle can be set. Because the flexible basic body can be fixed, for example, to the frame, it is possible to adjust the flexible basic body to the shape of the frame already without the adjustment device.

It has also been found to be an advantage if the frame, respectively the frame parts, have been manufactured from flexible profiles, in particular tubes, which can be moulded universally, they are, however, are designed that they are after the moulding sufficiently stable to keep the chosen form of the frame, respectively the frame parts. Flexible tubes of this kind are, for example, known in the lamp technique or also as tripods which can be changed universally.

According to a further development of the variable background it is provided that the flexible profiles are arranged as adjustment device on the flexible basic body. It is, for example, provided that on the flexible basic body fastening devices, as described above, are arranged which are located correspondingly also to that on the flexible profiles. By means of the connection of the flexible basic body via the fastening device it is possible then to use these flexible profiles simultaneously as adjustment device for the flexible basic body. This results in a large number of design possibilities for the variable background.

A development of the variable background according to the invention provides that the frame parts are linked with joints. These joints here can be fixed and are equipped with catchings. By means of that very different angles of the frame, respectively the frame parts to each other, can be set quickly.

A development of the solution according to the invention provides that at least a part of the taking region is formed by an opaque slab, which preferably can be also mounted on, respectively at, the frame. Advantageously, of course, also the flexible basic body can be mounted to this slab by means of accordingly provided fastening devices.

It has also been found to be an advantage if a light source can be arranged below, respectively before or behind, the variable background. By means of that again very different photographic techniques can be realised.

According to the invention it has also been found that it is convenient if a repro column is provided which can be fastened to the frame. This repro column can be fastened universally to very different points of the frame or even outside this range, for example, to a desk. Light sources or even a photo camera, respectively a video camera, can be fastened themselves to this repro column.

The variable background according to the invention is characterised according to a development by the fact that a transport device is provided where all parts of the variable background are stored in such a way that they are, during the transport, fixed in it and, in particular, protected against concussions and damages.

Another aspect of the invention is indicated by a flexible photograph desk, comprising a flexible basic body according to one or more of the embodiments of the invention described before, and a frame which the flexible basic body can be put on and in particularly be fastened to. By means of such a solution then always a universal and flexible desk is available the kind of which is not known so far in the state of the art. This photograph desk can be, without any problems and in a very short period of time, dismantled and therefore stored in any car without special transport apparatus.

The invention also provides a system for a variable background comprising at least one flexible basic body according to one or more of the embodiments described above, at least one frame as described above and at least one opaque slab, one or more light sources, one or more repro columns and at least one transport device. By means of providing a certain system out of the variants mentioned, according to the respective demands of the customer, for each special application the necessary material can be assembled and this may be carried out on very short notice so that very different demands can also be met on a short notice.

BRIEF DESCRIPTION OF THE DIFFERENT VIEWS

The invention is further described in the following by means of embodiments and drawings.

Figure 1B:
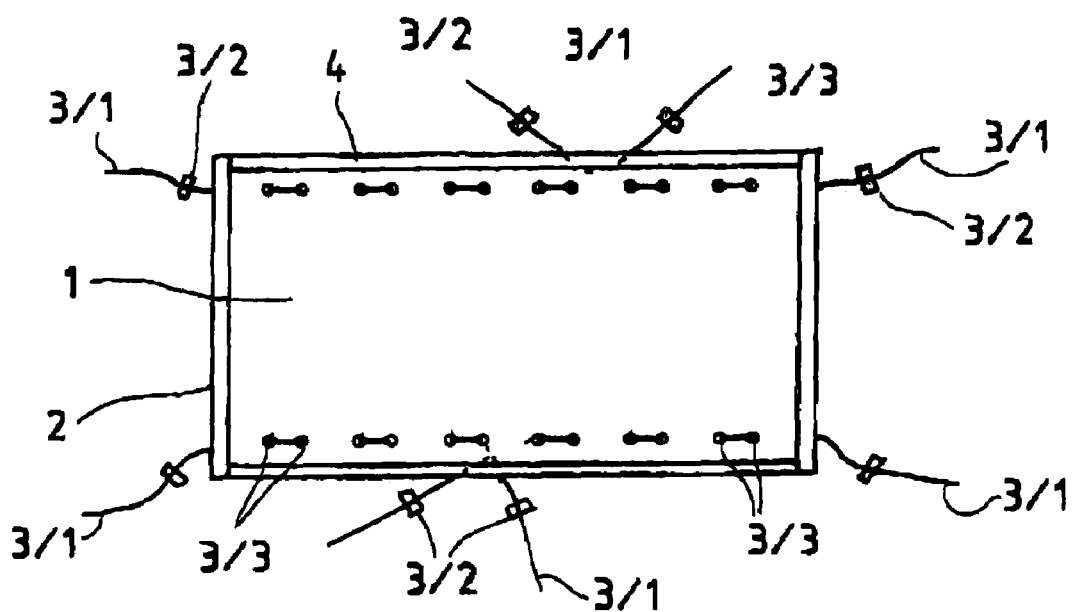
Figure 3:
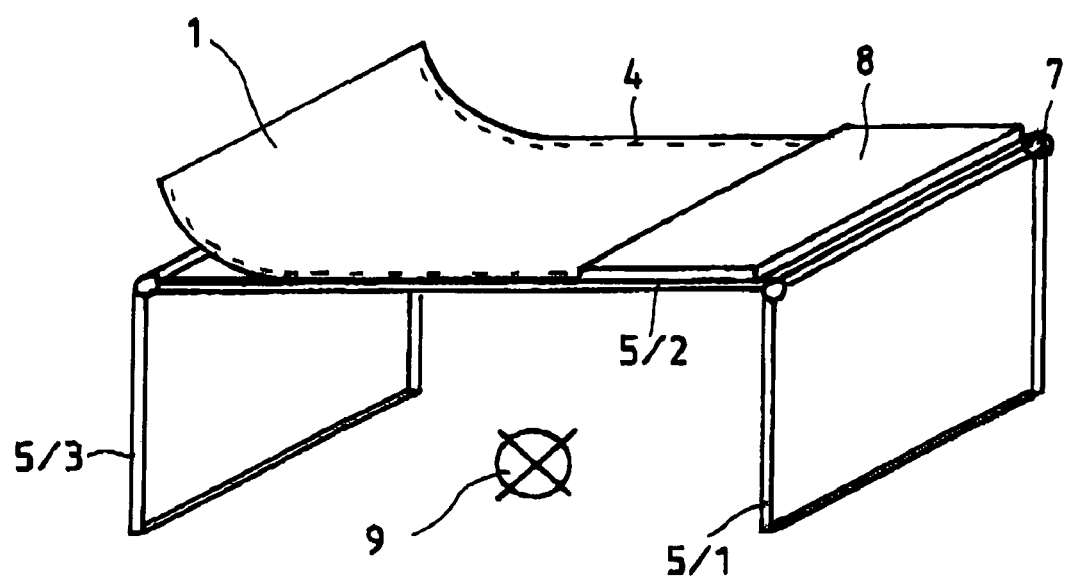
Figure 4:
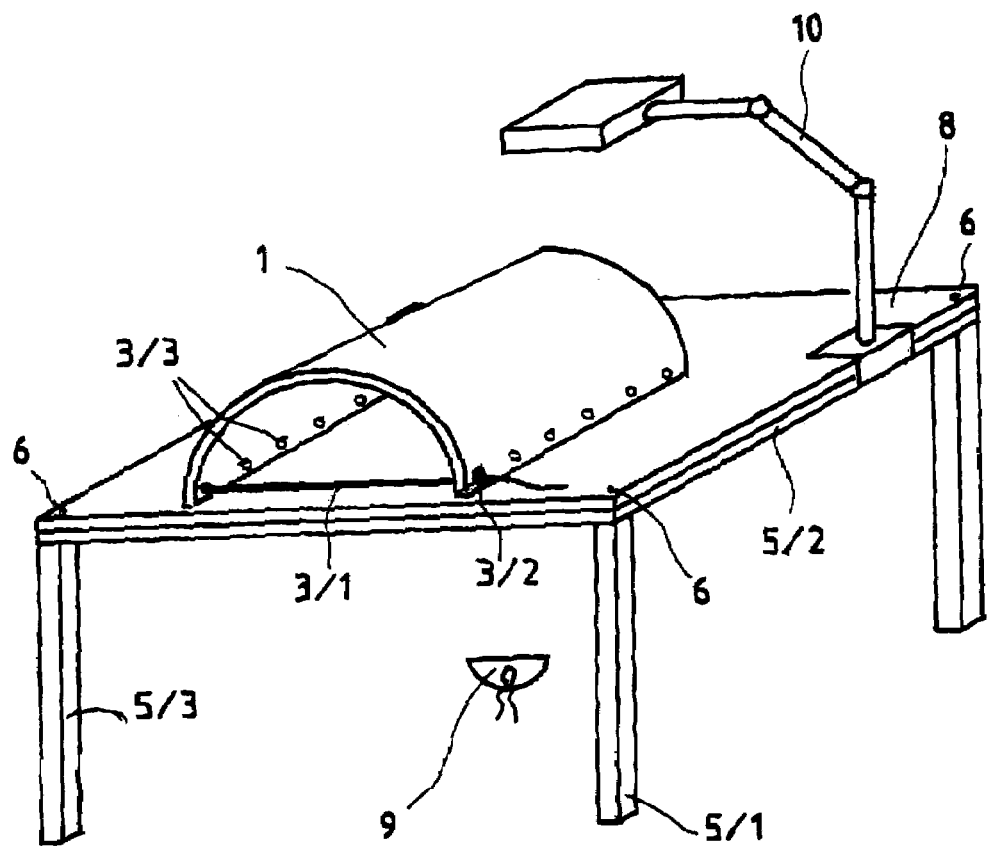
Figure 5A:
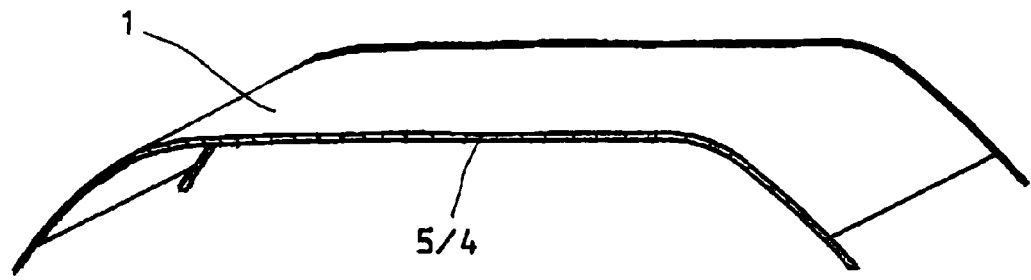
Figure 5B:
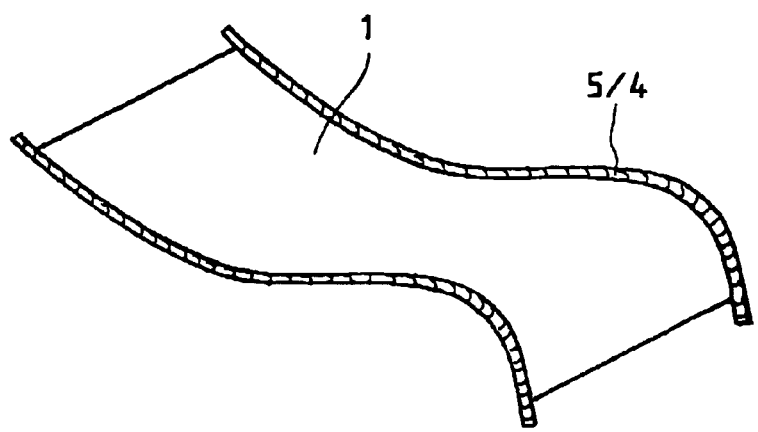

In the figures:

FIGS. 1a and 1b top view of flexible basic bodies according to the invention,

FIGS. 2a–2d side views of embodiments of the flexible basic body,

FIG. 3 photograph desk, comprising a flexible basic body, frame and supplementary parts, FIG. 4 further embodiment of a photograph table according to the invention, FIGS. 5a and 5b variable basic body with flexible frame.

DETAILED DESCRIPTION OF THE PREFERRED EMBODIMENT

FIG. 1a shows a variable background according to the invention in its simplest embodiment. Here this variable background comprises a flexible basic body 1. The object which has to be photographed has to be put on this flexible basic body. The flexible basic body here can be formed, for example, by a translucent, colourless and/or coloured plastic foil, respectively metal foil. The flexible basic body can also be formed by a white or coloured cardboard which is sufficiently stiff. On the sides of the flexible basic body 1 the adjustment device 3 is arranged.

The adjustment device 3 is formed by a string 3/1, the fixing means 3/2 as well as the openings 3/3. These are arranged in regular distances on the basic body, as well as in pairs, respectively in different distances. For example, the openings 3/3 are the results of punching. Suitable as fixing means 3/2 are in particular clamps through which the string 3/1 is guided and the clamp is held in the fixed position by means of spring power. If the tension of the string 3/1 has to be changed the fixing means 3/2 is released and then again fixed in the new desired position, and in the simplest form a fixing can be achieved, for example, also by means of a knot in the cord string. The flexible basic body 1 has such a stiffness that it forms an even surface and is not undulated and even through tensioning by means of the adjustment device 3 keeps an even surface at the bendings. This is reached, for example, by means if a suitable thickness of the foil, respectively the cardboard. The string 3/1 which also may be a rope, a fiber or the like, is guided in S-shape through the openings 3/3. Preferably the string 3/1 is fastened to one end of the flexible basic body 1, respectively fixed, and can be fixed to the other side (in FIG. 1a on the right hand side) by means of a fixing means.

FIG. 1b shows a development of the variable background according to the invention. Here the flexible basic body 1 has, in addition to the already described features, reinforcements 2 on the left hand and the right hand side each which are fixedly as well as releasably linked with the flexible basic body. These reinforcements 2 are intended to prevent a sagging of the flexible basic body 1 when the object which has to be photographed has a corresponding weight. In the drawing according to FIG. 1b on the longitudinal sides of the flexible basic body 1 fastening devices are arranged by means of which the flexible basic body can be fastened to a support, for example a frame or a desk. By means of that, for example, an unintended shifting, respectively moving, is made more difficult, respectively prevented altogether. The fastening means 4 can be indicated for example by a Velcro fastener, snap fasteners, zip fasteners or the like. The reinforcements 2 on the cross sides of the flexible basic body 1 are indicated preferably by metal bows, plastic reinforcements or simple angles of the foil itself. The reinforcements 2 are designed alternatively fixedly or removable. The embodiment of the flexible basic body 1 according to FIG. 1b shows that in this drawing two strings 3/1 are arranged on each side of the flexible basic body so that by means of the adjustment device 3 there is the possibility to influence the basic body with different tensions, realising very different shapes.

Figure 2A:
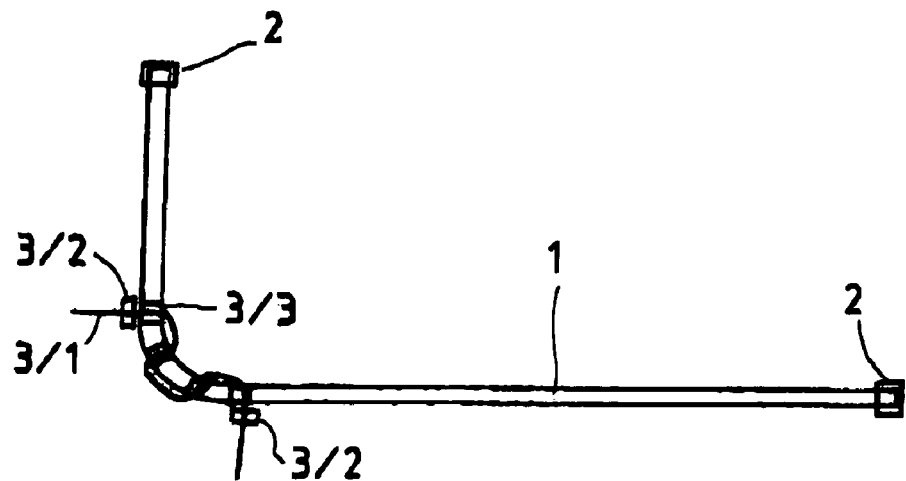

The FIG. 2a shows a flexible basic body 1 which has been tensioned by means of the adjustment device 3 in an angled form. This is here a rectangular tensioning of the basic body 1. However, this may be easily modified by changing the tension. By means of that easily also another angle shape deviating form a right angle can be reached. With the reference number 2 the reinforcements are indicated again which are, for example, in this drawing designed in such a way that they can be inserted.

Figure 2B:
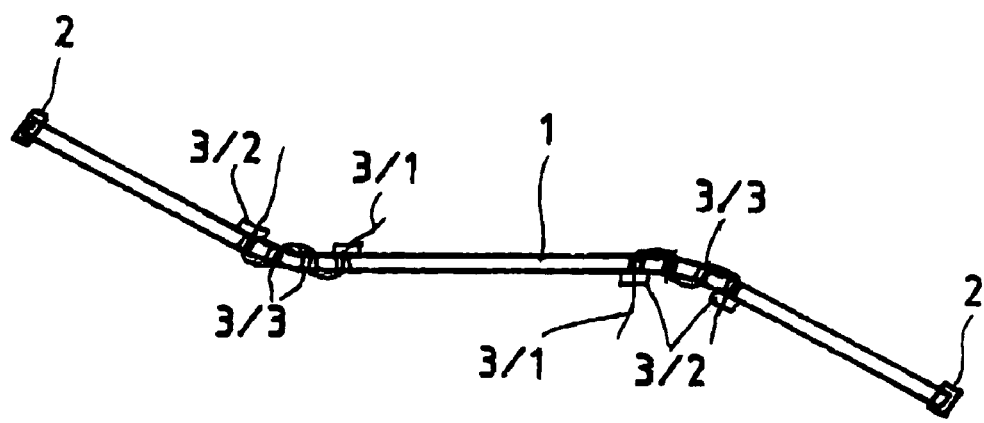

FIG. 2b shows another embodiment for the angle possibilities of the flexible basic body 1. By means of tensioning the flexible basic body 1 on two points with two independently working adjustment devices 3 here two angles have been formed which can be realised for special photo pictures.

Figure 2C:
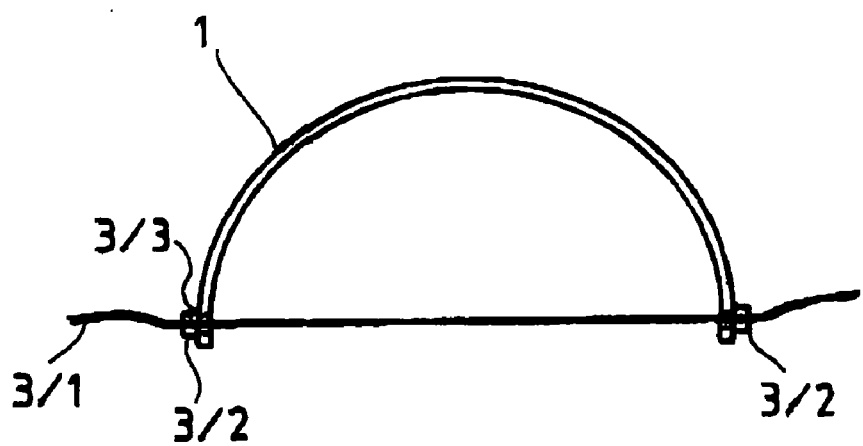

FIG. 2c shows a tensioning of the flexible basic body 1 in tunnel shape. This may be achieved, for example, by guiding a string 3/1 on both sides through the flexible basic body, respectively the openings 3/3 located there. On both sides then in the drawing according to FIG. 2c the flexible basic body is fixed by means of the fixing means 3/2 so that the tunnel shape remains. The flexible basic body can be designed, according to a very preferred variant, also as a narrow strip which is tensioned on both sides by means of the string 3/1 in such a way that the already mentioned tunnel shape appears. This tunnel shape then can be positioned upright like a tunnel. However, it is also possible to put the tunnel formed in such a way on its side surfaces so that a semicircular background is produced between which, for example, the object which has to be photographed can be located. Here it is furthermore an advantage if a lighting device is positioned, for example in a carrier particularly provided for that purpose, near the background in order to reach special light effects. If a self-standing stand for the light device is chosen and the upper part of the light source itself is designed that it can be angled, very different light effects by means of the variant described above can be reached in the design of the basic body. The fixing of the string 3/1 can be carried out by knotting or by the already described fixing means, respectively fastening means. By means of different tension different bow shapes can be produced. Such a solution can be realised very simply and causes comparatively low costs. The material of the flexible basic body can be produced here from a translucent foil, a white foil or even from other suited materials like metal foils which can be bent flexibly.

Figure 2D:
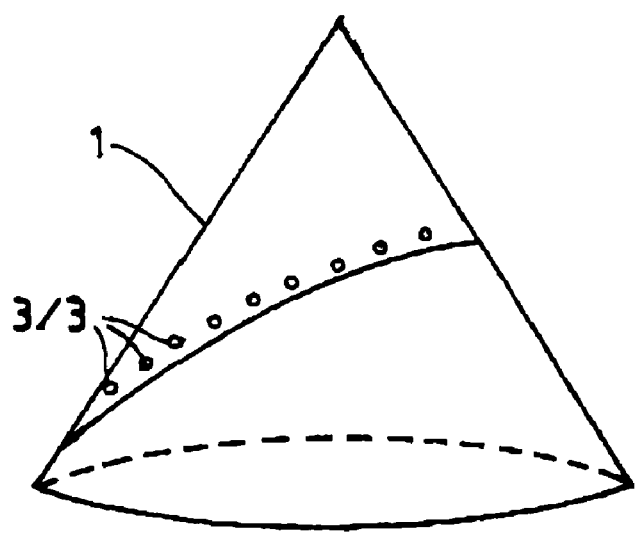

For very special photographic pictures the tent form of the flexible basic body 1 is suited, as it is shown in FIG. 2d. The tent body is brought into the desired tent form by means of rolling the flexible basic body. By means of the fixing means 3/1, respectively other provided fixing means, this form can be stabilised so that during the taking no changes of the undesired kind occur. Of course, by means of rolling the basic body 1 with other angles, respectively tensions, also the form of a truncated cone can be produced.

FIG. 3 shows a development of the solution according to the invention. This is a flexible basic body 1 which is arranged on a frame 5 consisting of frame parts 5/1, 5/2 and 5/3.

At the connection points of the single frame parts 5/1, 5/2, respectively 5/3, joints 7 are arranged. These joints are designed preferably in such a way that they can be fixed. In particular they may be fixed in such a way that different angle positions can be realised in a very short period of time. On the frame part 5/2 an opaque slab is arranged as it is already used normally for photographic pictures. The opaque slab 8 is supported plainly by the frame part 5/2 and can preferably be fixed. The combination of an opaque slab 8 and a flexible basic body 1 increases the possibilities for special photographic pictures. With the reference number 4 in the drawing according to FIG. 3 the fastening device is indicated schematically.

FIG. 4 shows a photograph desk which has been created by the combination of the single frame parts 5/1, 5/2, 5/3 via inserted connectors 6. With the reference number 8 again the opaque slab is indicated on which a flexible basic body is arranged in this drawing in the form of a tunnel. Below the frame part 5/2 a light device 9 is arranged by means of which special light effects can be realised from below. With the reference number 10 a repro column is indicated on which also a light, a mirror or other completion parts for photographic pictures may be arranged. Of course, it is also possible to fasten a camera to the repro column 10.

FIGS. 5a and 5b show developments of the solution according to the invention. This embodiment is characterised by the fact that the flexible basic body is arranged on flexible frames, respectively frame parts 5/4. These flexible frame parts are formed, for example, by a flexible tube which can be angled in very different forms and which has a sufficient stability so that it can be angled, for example for certain photographic pictures, into an angled form which then remains during the taking. Flexible frame parts like that are created for example as tubes, respectively box-like elements, consisting of individual segments. FIG. 5a here shows a trapezoid body which has been produced by bending the frame parts 5/4. In the drawing 5b the flexible basic body has been brought into an S-shaped position which is given through the frame parts 5/4.

Although the invention has been described by exact examples which are illustrated in the most extensive detail, it is pointed out that this serves only for illustration and that the invention is not necessarily limited to it because alternative embodiments and methods become clear for experts in view of the disclosure. Accordingly changes can be considered which can be made without departing from the contents of the described invention.

The invention claimed is:

1. A variable background for photographic pictures, comprising:
   a flexible basic body which supports the object to be photographed and at least one adjustment device for modifying the shape of the basic body;

wherein the flexible basic body has such stiffness that it can take different shapes and keeps a smooth surface when the shape is modified;

wherein the adjustment device comprises openings obtained at least on one side of the flexible basic body by means of punchings and a string or a fiber being guided alternately through said openings;

wherein at least one end of the string or fiber can be fixed by means of a fixing means;

and wherein the basic body is fixedly put on a frame.

2. The variable background according to claim 1, wherein the flexible basic body is formed by a translucent, colorless or colored foil.

3. The variable background according to claim 1, wherein the flexible basic body is formed either by a plastic foil, by paper, by a cardboard, or by a flexible metal foil.

4. The variable background according to claim 1, wherein at least on one of the cross sides of the flexible basic body reinforcements are provided; and wherein the reinforcements comprise metal bows or plastic.

5. The variable background according to claim 1, wherein the flexible basic body can be brought into an angled position by means of the adjustment device, wherein the angle can be chosen freely and can be modified freely, according to the photographic picture or photo technique.

6. The variable background according to claim 1, wherein at least two or more angulations of the flexible basic body are provided.

7. The variable background according to claim 1, wherein the basic body has such a stiffness that the basic body forms a tunnel if opposite sides of the basic body are linked and tensioned by means of the adjustment device.

8. The variable background according to claim 1, wherein the basic body assumes the shape of a tent, a tube, a cone, or a truncated cone by tensioning the string or fiber of the adjustment device through restricting the length of the string or fiber by the fixing means.

9. The variable background according to claim 1, wherein, on the longitudinal sides of the basic body, fastening devices are provided by means of which the basic body can be fastened to a support.

10. The variable background according to claim 9, wherein the fastening devices are VELCRO fasteners, snap fasteners or zip fasteners.

11. The variable background according to claim 1, characterised in that the frame consists of at least three parts, wherein the individual frame parts are connected to each other.

12. The variable background according to claim 1, characterised in that the frame consists of at least three parts, wherein the individual frame parts are connected to each other by means of inserted connectors.

13. The variable background according to claim 1, characterised in that the frame consists of at least three parts, wherein the individual frame parts are connected with each other by means of inserted connectors and the inserted connectors are available in different angles.

14. The variable background according to claim 1, characterised in that the frame consists of at least three parts, wherein the individual frame parts can be connected to each other by means of joints which can be fixed.

15. The variable background according to claim 1, wherein the frame is or the frame parts forming the frame are flexible and, after the forming, sufficiently stable in order to keep a chosen form of the frame or the frame parts.

16. The variable background according to claim 1, wherein the frame consists of flexible profiles and the flexible profiles are arranged as adjustment device on the flexible basic body.

17. The variable background according to claim 1, characterised in that the frame consists of at least three parts, wherein the individual frame parts are connected with each other by means of joints which are provided fixedly with catchings.

18. The variable background according to claim 1, wherein at least a part of a region of the flexible basic body for taking the photographic pictures is formed by an opaque slab which is also fastened to the frame.

19. The variable background according to claim 1, wherein a light source is arranged below, before, or behind the variable background.

20. The variable background according to claim 1, wherein a repro column is provided which is fastened to the frame on which the flexible basic body is put.

21. A flexible photograph desk, comprising a flexible basic body according to claim 1, and the frame which supports the flexible basic body and where the basic body can be fastened.

22. A system for a variable background, comprising at least one flexible basic body according to claim 1, at least one opaque slab, one or more light sources, one or more repro columns and at least one transport device.

23. The variable background according to claim 1, wherein the overall shape of the string or fiber is S-like when the string or fiber is guided through the openings of the adjustment device.

* * * * *